United States Patent
Ditt et al.

(10) Patent No.: US 6,856,310 B2
(45) Date of Patent: Feb. 15, 2005

(54) DEVICE FOR MANUALLY GUIDED REGISTRATION FOR OVERLAYING TWO DATASETS

(75) Inventors: Hendrik Ditt, Hoechstadt (DE); Norbert Rahn, Forchheim (DE); Siegfried Wach, Hoechstadt (DE)

(73) Assignee: Siemens Aktiengesellschaft, Münich (DE)

( * ) Notice: Subject to any disclaimer, the term of this patent is extended or adjusted under 35 U.S.C. 154(b) by 229 days.

(21) Appl. No.: 10/268,491

(22) Filed: Oct. 9, 2002

(65) Prior Publication Data

US 2003/0083759 A1 May 1, 2003

(30) Foreign Application Priority Data

Oct. 9, 2001 (DE) .......................... 101 49 795

(51) Int. Cl.[7] .................................. G09G 5/00
(52) U.S. Cl. ................. 345/156; 345/157; 345/701
(58) Field of Search ........................... 345/156–158, 345/161–167, 701, 702; 600/102, 104, 118; 318/568.11, 568.17

(56) References Cited

U.S. PATENT DOCUMENTS

| | | | | |
|---|---|---|---|---|
| 4,837,732 A | * | 6/1989 | Brandestini et al. | 433/29 |
| 5,572,999 A | * | 11/1996 | Funda et al. | 600/118 |
| 5,629,594 A | * | 5/1997 | Jacobus et al. | 318/568.11 |
| 5,911,036 A | * | 6/1999 | Wright et al. | 700/259 |
| 6,246,390 B1 | | 6/2001 | Rosenberg | |
| 6,267,599 B1 | * | 7/2001 | Bailey | 434/262 |
| 6,423,009 B1 | * | 7/2002 | Downey et al. | 600/461 |
| 6,522,906 B1 | * | 2/2003 | Salisbury et al. | 600/407 |

FOREIGN PATENT DOCUMENTS

DE PS 197 26 226 7/2001

OTHER PUBLICATIONS

Web Pages from HTTP:/www.zmonline.de/zm/23 00/pages 2/title 5.htrn.
Semiautomatic 3–D Image Registration as Applied to Interventional MRI Live Cancer Treatment, Carillo et al., IEEE Trans. on Medical Imaging, vol. 19, No. 3, Mar., 2000, pp. 175–185.

* cited by examiner

*Primary Examiner*—Xiao Wu
(74) *Attorney, Agent, or Firm*—Schiff Hardin LLP

(57) ABSTRACT

In a device for manually guided registration for overlaying two datasets, a quality of the registration is calculated and is used to generate an answerback control signal to a three-dimensionally manipulable input device, which is used to control the registration. If the quality of the registration deteriorates, the answerback signal causes the input unit to oppose further manipulation in at least one direction which would continue or increase the deterioration of the registration. The answerback signal can brake the input unit from further manipulation in at least one manipulation direction, or can cause the input unit to attempt to return to an initial or previous position.

7 Claims, 1 Drawing Sheet

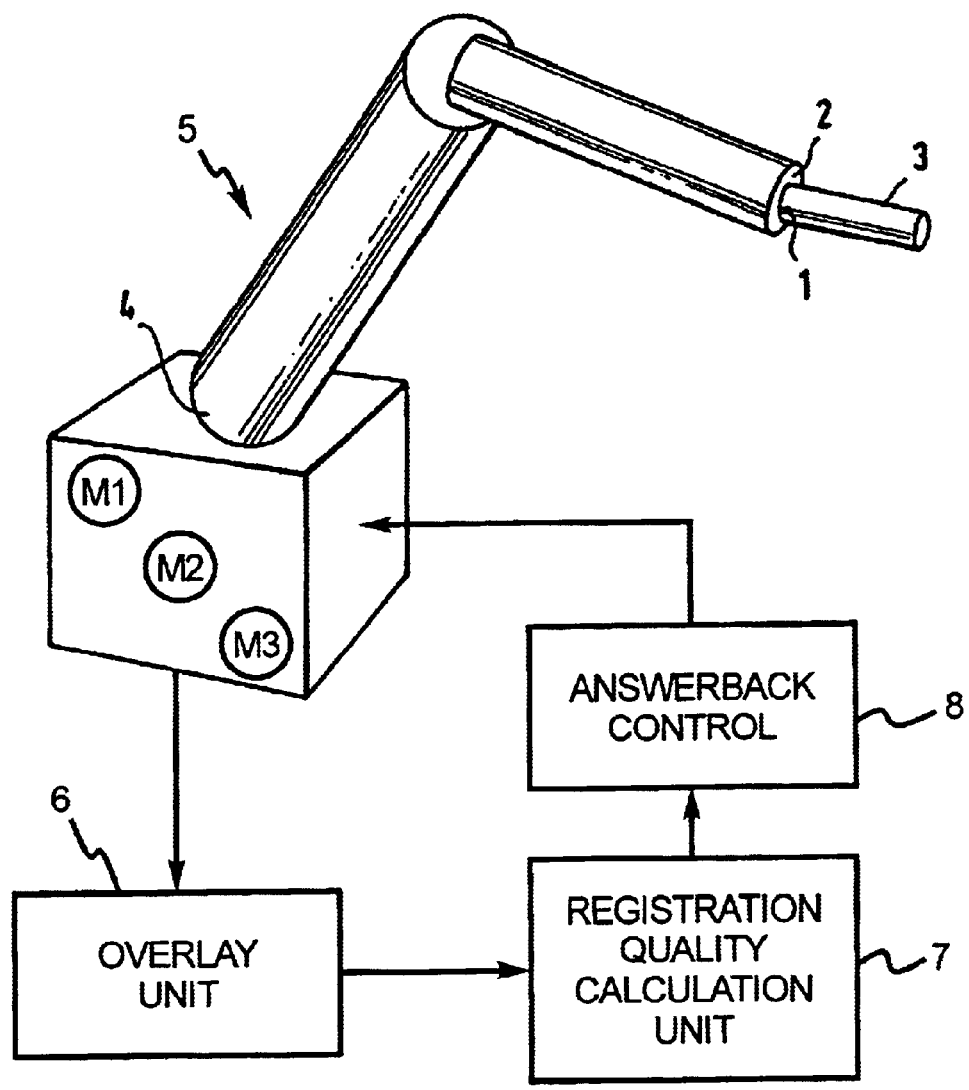

DEVICE FOR MANUALLY GUIDED REGISTRATION FOR OVERLAYING TWO DATASETS

FIELD OF THE INVENTION

The present invention is directed to a device suitable for use in manually guided registration, associated with overlaying two datasets in order to obtain a fusion of the two datasets.

DESCRIPTION OF THE PRIOR ART

A fusion of to datasets produced by overlaying the two datasets is required for the presentation of a number of uni-modal or multi-modal datasets. In order to overlay a number of datasets, a registration must be found that images or maps the contents of one dataset onto the other dataset. Such a fusion can occur between two-dimensional images, three-dimensional volumes as well as between a volume and an image. For example, such fusion can be the fusion of a two-dimensional X-ray image with the perspective projection of a CT exposure. Manual, semi-automatic and automatic techniques are utilized in the known methods for registration. Affinity registrations, wherein the degrees of freedom of translation, rotation, scaling and shearing are taken into consideration, must be additionally distinguished from deformable registrations wherein individual sub-regions of the volumes are differently registered and the volume is thus deformed.

Examples of manual methods are visual alignment (all degrees of freedom are manipulated under visual monitoring) and landmark registration (a number of anatomical or artificial landmarks in both datasets are thereby identified and the registration matrix is calculated by their position).

For example, surface matching can be employed as a semi-automatic method. Structures in both sets of volume data are manually segmented and an attempt is subsequently made to find a registration at which the structures exhibit the least distance from one another. Automatic methods function without an interaction with the user. The quality of the registration is determined on the basis of a dimension FIGURE that is calculated from the matrix employed. Cross-correlation, mutual information and normalized mutual information are examples of this. An improvement of the registration is achieved by means of an improvement of this dimension FIGURE.

When these methods are singularly employed, then the following technical problems occur:
- the registration quality can only be visually evaluated with the manual methods (see Carillo, A., et al., Semi-automatic 3-D Image Registration as Applied to Interventional MRI Liver Cancer Treatment, in IEEE Transactions on Medial Imaging, vol. 19, no. 3, March 2000, pp. 175–185);
- although the registration quality is calculated on the basis of a dimension FIGURE in the semi-automatic and fully automatic methods, these methods are very calculation-intensive since many possible improvement steps must be calculated (for example, iteration is carried out over all degrees of freedom in every step in most methods in order to find a greatest possible improvement). For this reason, a result is obtained only after a longer calculating time. Further, an optimum registration result is not always guaranteed. Moreover, no manual intervention is possible given these semi-automatic and fully automatic methods.

These problems become more serious when a switch is made from an affinity (or even rigid) registration to registering the two datasets deformably. The calculating time of the automatic methods increases enormously, and a manual setting of the registration becomes nearly impossible because of the large number of degrees of freedom.

No noteworthy improvement can be achieved with the conventional, standard combination methods if two datasets are first registered with manual methods in order to obtain good starting conditions. Subsequently, an attempt is made to improve this registration with automatic methods with large calculating outlay. However, only a relatively slight reduction of the long calculating time of the automatic methods is derived.

SUMMARY OF THE INVENTION

An object of the present invention is to provide a manually guided registration for overlaying two datasets wherein an improved acquisition of the registration quality is possible compared to purely visual evaluation.

For achieving this object, an input device, preferably 3-D input device, is inventively provided for varying the individual degrees of freedom of the registration with a robot arm with a corresponding number of degrees of freedom of motion, wherein the registration quality generates an automatic feedback for each degree of freedom by a registration motion that leads to a deterioration of the quality by causing a manually operated input device for the robot to oppose further manual movement of the input device, such as by braking the input device or attempting to move it back into an initial position.

Inventively, manual and (semi-) automatic registration techniques are united with one another by the user constantly receiving an answerback, in the form of a haptic feedback, about the quality of the current registration during a manual registration, so that the user can interactively improve the quality therefrom. As a result of this constant answerback of the quality of the current registration, which is constantly calculated as in automatic registration methods and is signal to and displayed for the user implementing the manual registration as a direct feedback, the time required for the registration is considerably shortened given an unaltered registration quality.

A drastic reduction in the calculating time can be achieved particularly in deformable registration. Individual sub-regions of a dataset can be shifted and rotated with the inventive approach. For example, it is possible to initially rigidly register a dataset. If it is found that such a registration is inadequate, then the dataset can be subdivided. Each sub-region is subsequently individually registered. Deformations that are caused by different registrations in sub-regions thereby occur at the boundary zones. Since such a registration of a sub-region can be calculated faster with the inventive registration method, the overall time for calculating the deformable registration can be quite significantly shortened particularly in those instances involving a registration of the datasets via the individual registration of sub-regions.

A monitoring of an image can ensue with a two-dimensional input device. For example, monitoring of tomograms is possible, individual images can be shifted and rotated in order to thus change the registration (in 3-D as well). Likewise, a control is possible via external mechanisms, for example via slide controllers that respectively monitor one degree of freedom. A control can likewise be imagined wherein the registration is controlled by employing speech. Instead of an answerback device that visually displays the registration quality or instead of a device with haptic feedback, of course, an answerback with acoustic indication also can be employed wherein, for example, the quality of the registration is indicated via different tonal pitches.

DESCRIPTION OF THE DRAWING

The single FIGURE is a schematic illustration and block diagram of a device for manually guided registration for overlaying two datasets, constructed and operating in accordance with the principles of the present invention.

DESCRIPTION OF THE PREFERRED EMBODIMENTS

A 3-D input device 5 is able to get a 3-D position by means of a positioning point 1 in space. This point 1 is employed for calculating the translation of the registration of the two datasets. The position of the ball-and-socket joint 2 indicates the rotation of a dataset. A pin 3 can be turned in order to provide the third rotational axis. The device also has a revolute joint 4 movable around a further axis. The degrees of freedom of the 3-D input device allow an exact determination of the registration parameters. The 3D input device 5 has an installed motor M1, M2, M3 therein for each degree of freedom.

Dependent on the three-dimensional manipulation of the 3-D input device 5, a registration signal is supplied to an overlay unit 6, which otherwise operates in a known manner. As the two datasets are overlaid in the overlay unit 6, the current (i.e., ongoing) quality of the registration is calculated in a registration quality calculation unit 7. The registration quality calculation unit 7 generates an output signal representing the current registration quality, which is supplied to an answerback control 8 connected to the 3-D input unit 5. Dependent on the current registration quality, the answerback control 8 generates one or more control signals supplied to the 3-D input unit 5.

Although indicated separately as blocks in the FIGURE, any or all of the illustrated components can be combined.

The feedback preferably ensues via all illustrated articulations, such as by the control of respective drive motion M for the different articulations. The input device, similar to a robot, is thus capable of moving all articulations.

The quality for the currently set registration is calculated in the unit 7, for example, with the assistance of a metrics (for example, normalized mutual information NMI or by determining the distance from surfaces). When the 3-D input device 5 schematically shown in the FIGURE is moved in a particular direction, then this metrics is respectively calculated again for each new position and compared to the previous one. If this new metrics is improved in the direction of a good registration or remains the same, then the input device 5 dwells at this position. If a deterioration occurs, then signals from the answerback control 8 operate the installed motors M1, M2, M3 so that the 3-D input device 5 opposed further movement in a direction that would continue or increase the deterioration, such as by braking or attempting to return to the previous position. This restoring force is felt by the user and must be overcome by the user if the user believes that the registration is currently situated in a local extreme and will still improve at a different position.

Alternatively, the device can also be fashioned such that the individual devices cannot be moved themselves in the manner of a robot but impedes the user from moving the arm in a specific direction. The user thus directly senses the directions in which the user still can move for the purpose of a registration improvement.

Although modifications and changes may be suggested by those skilled in the art, it is the intention of the inventors to embody within the patent warranted hereon all changes and modifications as reasonably and properly come within the scope of their contribution to the art.

We claim as our invention:

1. A device for manually guided registration for overlaying two datasets, comprising:

a three-dimensionally manually manipulable input device which, dependent on three-dimensional manual manipulation thereof, generates a signal for controlling registration of two datasets being overlaid, said input device having a plurality of degrees of freedom of motion respectively corresponding to a plurality of degrees of freedom of the registration;

a registration quality calculation unit which, simultaneously with manipulation of said input unit, at least semi-automatically calculates a current quality of said registration; and an answerback unit, connected to said registration quality calculation unit and to said input device, which provides an automatic feedback signal to said input unit dependent on said current quality of said registration which causes said input unit to oppose further manipulation of said input unit in at least one of said degrees of freedom in a direction that would reduce said current quality of said registration.

2. A device as claimed in claim 1 wherein said input unit has an initial three-dimensional position, and wherein said answerback unit generates a signal to said input unit causing said input unit to attempt to return to said initial three-dimensional position if said current quality of said registration deteriorates.

3. A device as claimed in claim 1 wherein said answerback unit generates a signal to said input unit braking further manipulation of said input unit if said current quality of said registration deteriorates.

4. A device as claimed in claim 1 wherein said overlay unit allows registration of sub-regions of said two datasets to be manually registered via said input unit, said sub-regions having boundary zones, and wherein said registration quality calculation unit calculates said current quality of said registration dependent on a quality of registration at said boundary zones.

5. A device as claimed in claim 1 wherein said input device has a plurality of motors, respectively for said plurality of degrees of freedom of motion, and wherein said answerback unit operates said motors to provide haptic feedback to a user of said input unit.

6. A device as claimed in claim 1 wherein said registration quality calculation unit calculates said current quality of said registration using a normalized mutual information technique.

7. A device as claimed in claim 1 wherein said registration quality calculation unit calculates said current quality of said registration by a technique employing calculations of distances from surfaces.

* * * * *